United States Patent [19]
Ackley

[11] Patent Number: 6,042,279
[45] Date of Patent: Mar. 28, 2000

[54] METHOD AND APPARATUS FOR PRINTING WITH REAL-TIME PRINT QUALITY CORRECTION, SUCH AS IN ONE OR TWO DIMENSIONAL BAR CODE PRINTING

[75] Inventor: H. Sprague Ackley, Seattle, Wash.

[73] Assignee: Intermec IP Corporation, Beverly Hills, Calif.

[21] Appl. No.: 09/010,946

[22] Filed: Jan. 22, 1998

[51] Int. Cl.[7] .................................................. B41J 2/00
[52] U.S. Cl. ........................ 400/103; 400/104; 400/76; 400/70; 400/61
[58] Field of Search ...................... 101/483; 235/462; 347/195; 400/103, 76, 70, 61, 104

[56] References Cited

U.S. PATENT DOCUMENTS

| | | | |
|---|---|---|---|
| 3,787,881 | 1/1974 | Duffield | 346/75 |
| 4,592,893 | 6/1986 | Poppe et al. | 422/56 |
| 4,699,531 | 10/1987 | Ulinski, Sr. et al. | 400/74 |
| 4,741,045 | 4/1988 | Denning | 382/9 |
| 4,762,063 | 8/1988 | Yeagle | 101/93.01 |
| 4,795,281 | 1/1989 | Ulinski, Sr. et al. | 400/74 |
| 4,831,610 | 5/1989 | Hoda et al. | 369/48 |
| 5,089,691 | 2/1992 | Morisaki et al. | 235/375 |
| 5,206,490 | 4/1993 | Petigrew et al. | 235/462 |
| 5,247,371 | 9/1993 | Hikawa et al. | 358/448 |
| 5,366,307 | 11/1994 | McGourty et al. | 400/708 |
| 5,376,806 | 12/1994 | Hejazi | 250/584 |
| 5,488,223 | 1/1996 | Austin et al. | 235/375 |
| 5,563,986 | 10/1996 | Suzuki | 395/114 |
| 5,564,841 | 10/1996 | Austin et al. | 400/103 |
| 5,625,399 | 4/1997 | Wiklof et al. | 347/195 |
| 5,633,488 | 5/1997 | Spitz | 235/462 |
| 5,804,342 | 9/1998 | Paz-Pujalt et al. | 430/19 |
| 5,843,599 | 12/1998 | Paz-Pujalt et al. | 430/17 |

OTHER PUBLICATIONS

Microsoft Press Computer Dictionary Third Edition, p. 43, Dec. 1998.

*Primary Examiner*—John S. Hilten
*Assistant Examiner*—Charles H. Nolan, Jr.
*Attorney, Agent, or Firm*—Perkins Coie LLP

[57] ABSTRACT

A printer and method of printing including in a feedback mechanism having an imaging head for imaging, digitizing, or sampling at least a portion of a symbol, a comparator for comparing the imaged portion to a print command provided by a print logic print driver so as to generate print logic update information, whereby the print logic is updated in real time in response to the print logic update information.

21 Claims, 7 Drawing Sheets

METHOD AND APPARATUS FOR PRINTING WITH REAL-TIME PRINT QUALITY CORRECTION, SUCH AS IN ONE OR TWO DIMENSIONAL BAR CODE PRINTING

TECHNICAL FIELD

The present invention relates generally to a method and apparatus for printing, and more specifically to a method and apparatus for printing two-dimensional machine-readable symbols.

BACKGROUND OF THE INVENTION

Printers exist in a variety of forms and combinations, such as impact, thermal, dot-matrix, laser, or xerographic. Typically, printers require a supply of a media on which to print, which will usually take the form of either a continuous roll of paper, plastic or other print media, or individual sheets. The printer will include a printhead and often includes a drive system for causing relative movement between the print media and the printhead. The printhead is usually controlled by way of a print logic which outputs a print command to a print driver, which in turn provides energizing signals to the printhead. The print command may be composed of print data and a strobe signal, where the print data represents whether or not a respective print element or resistive element is to be activated, and the strobe signal determines the duration, period or intensity with which the respective element will be activated.

Errors may be introduced in the printed output due to variations in a variety of printing parameters, such as the speed of the media relative to the printhead, the speed of the printhead, the thermal lag time of the resistive elements in a thermal printhead, heat generated by adjacent resistive elements and the composition of the media. For example, in the case of dot-matrix printed characters formed by a thermal printhead, an increase in speed of the media relative to the printhead introduces elongation or dot smear. This is a particularly acute problem in the case of bar code symbol printing, since the symbol encodes information in the width of the bar and the space elements. In another example, the previous temperature of a resistive element, as well as, the temperature of adjacent resistive elements can have a negative effect on the dimensions and quality of the printed image unless adequate compensation is provided. Bar code symbols are just one type of machine-readable symbol in which the tolerance of the printed image is closely related to the reader's ability to capture the image in a single scan, and to correctly interpret the captured image.

One attempt to solve the problem presented by variations in printing parameters is disclosed by Ulinski, Sr. et al. in U.S. Pat. No. 4,699,531. The Ulinski reference is specifically directed to correcting errors introduced in bar code characters of a bar code symbol. Ulinski teaches the placement of a bar code scanner immediately after the printhead in a bar code printer. Once an entire bar code label has been printed, the bar code scanner scans across the printed label, reducing the information in the bars and spaces to dimensional information. The dimensional information is then used to uniformly adjust the duration of voltage application to the thermal elements of the printer to improve the print quality of subsequently printed symbols. Ulinski is thus limited to rejecting a label after it has been printed, and cannot update the print logic while the label is being printed. Ulinski is also limited to detecting errors only in picket fence mode printing. Again, this is due the nature of scanning which requires that every bar and space character of the symbol be scanned before it can be interpreted. Finally, Ulinski is limited to detecting errors in bar code symbols and would not work for other symbols such as alphanumeric characters and pictures or 20 bar code symbols.

Another attempt to solve the problem is disclosed in U.S. Pat. No. 5,564,841 issued to Austin et al. Austin discloses a printer and scanner combination which scans the output image from the printer using a verifier, and adjusts the printer operating parameters (print speed, head pressure, burn duration) based on the quality grade produced by the verifier. A verifier is a commercially available instrument to automatically determine if a symbol's dimensions are in compliance with published 2-dimensional symbol specifications. Like Ulinski, the verifier in Austin is only capable of examining a symbol as a whole. Therefore Austin is limited to rejecting a label after it has been printed, and cannot update the printer parameters while the label is being printed. Austin, like Ulinski, is therefore also limited to detecting errors in picket fence mode printing, and would not be capable of inspecting drag mode printing. Austin is also limited to linear bar code symbols and would not work for other symbols such as alphanumeric characters and graphics and 20 bar code symbols. Additionally, neither Austin nor Ulinski would permit a printer operating parameter, such as printer speed, to be purposely increased, since in each case the disclosed inventions would respond to the dot smearing induced by the increased printer speed by adjusting the printer operating parameter downward to eliminate the smearing in the printed image.

SUMMARY OF THE INVENTION

Ulinski and Austin both fail to actually capture a digital image of the printed label, thus losing valuable information with respect to the quality of the printing. The use of scanning technology by both Ulinski and Austin prevents the capture of data until the entire label is printed. This is a fundamental limitation of bar code scanning technologies, since the information is encoded in a complete set of bars and spaces, not in individual bars and spaces.

The present invention overcomes the limitations of the prior art by providing a printer having an image head in a feedback mechanism for imaging, digitizing, or sampling at least a portion of a symbol, comparing the imaged portion to a desired image, and updating the print logic in response to the comparison.

In one exemplary embodiment, a drive system which includes a platen roller and a stepper motor is used to drive a media relative to a printhead and an image head. The image head may take the form of a thermal printhead. The thermal printhead is composed of a series of resistive elements. The resistive elements may be activated to heat the media having a thermally sensitive coating or a ribbon which is thermally sensitive and located proximate the media. Each of the resistive elements can be used to define one of a series of closely spaced adjacent dots. Activation of the resistive elements is controlled by a print logic by way of a print command delivered to a print driver. The print command may comprise a print data and a strobe signal. The print logic also controls the stepping motor.

An image head is placed relatively behind the printhead with respect to a printing direction. The image head optically images, digitizes, or samples at least a portion of an element printed by the printhead. In the exemplary embodiment, the system takes advantage of the motion of the media past the image head to successively capture each portion of the printed element as the printed element advances past the image head. The digitized image may be stored in a memory. A comparator, which may take the form of a programmed microprocessor, is used to compare the digitized image with the print command produced by the print logic. In a first exemplary embodiment, the comparison may be used to identify deviations between the digitized image of the most recently printed element and the desired image as encoded in the print command which was used to print that element. In a second exemplary embodiment, the comparison may be used to determine the thermal history of the resistive element which will print a selected pixel, as well as, the thermal state of the adjacent resistive elements. This permits the power delivered to a resistive element to be adjusted in real time to compensate for the thermal history of that resistive element and the neighboring resistive elements. In either embodiment, print logic update information may be generated from the comparison and used to dynamically update the print logic.

In the case of a bar code symbol, the digitized image may take the form of a bar code element (i.e., bar or space). The digitized image may even take the form of a portion of an element.

The image head contains an array of photosensitive elements, and may take the form of a linear charged coupled device. Other known imagers may be used, such as vidicons, two-dimensional semiconductor arrays, or two-dimensional charged coupled device arrays.

In the case of a linear charged coupled device, several imaging samples may be taken as the media advances past the image head, the samples being stored successively in a memory area to form a digital representation of the entire printed element. The memory area may take the form of a two-dimensional array. The array fields may be addressed using Cartesian coordinates to facilitate use. The print command may be loaded into a second memory area. The second memory area may also be formed as a two-dimensional array, elements of the array being addressed in Cartesian coordinate system. The first and second memory areas are in data communication with a comparison circuit which may be formed as a programmed microprocessor. The microprocessor is programmed to compare the digitized image with the print command. Based on this comparison, the microprocessor produces print logic update information. The print logic update information is used to update the print logic to correct for the detected or anticipated deviations.

The print logic may take a variety of forms, such as a hardwired circuit or as software encoded into a memory for execution by a microprocessor. In a first exemplary embodiment, the print logic is provided as a software program including a pointer to a set of print tables. The print tables may include a variety of print fonts. The print tables may, for example, include a low-speed font, a normal-speed font, and a high-speed font. The pointer of the print logic is updated by the print logic update information to point to an appropriate set of fonts based on the comparison data. This permits, for example, a high-speed font to be substituted for a low-speed font when print elongation or dot smearing is detected in a portion of a bar code symbol or other symbol.

In a second exemplary embodiment, the print logic is provided as a software program, including an algorithm or tables for adjusting the power delivered to a selected resistive element or group of resistive elements based on the comparison data. This would permit the power to each resistive element in a thermal printhead to be adjusted, individually or in groups, to compensate for a variety of factors effecting the printing, such as the particular characteristics of the media being used. In each embodiment the update may be made before an entire symbol or character is printed. This allows the quality of the symbol being printed to be continually updated during the printing of a single symbol. This also permits the quality of symbols or elements printed in drag mode to be verified and enhanced.

DETAILED DESCRIPTION OF THE INVENTION

An apparatus and method for real-time error correction in printing is described in detail herein. In the following description, numerous specific details are set forth such as print logic, print commands, print data, strobe signals, bar code symbols, bar code elements, and charged coupled displays, in order to provide a thorough understanding of the invention. One skilled in the relevant art, however, will readily recognize that the present invention can be practiced without specific details, or with other such details. In other instances, well-known structures and operations are not shown in detail in order to avoid obscuring the present invention.

Figure 1:
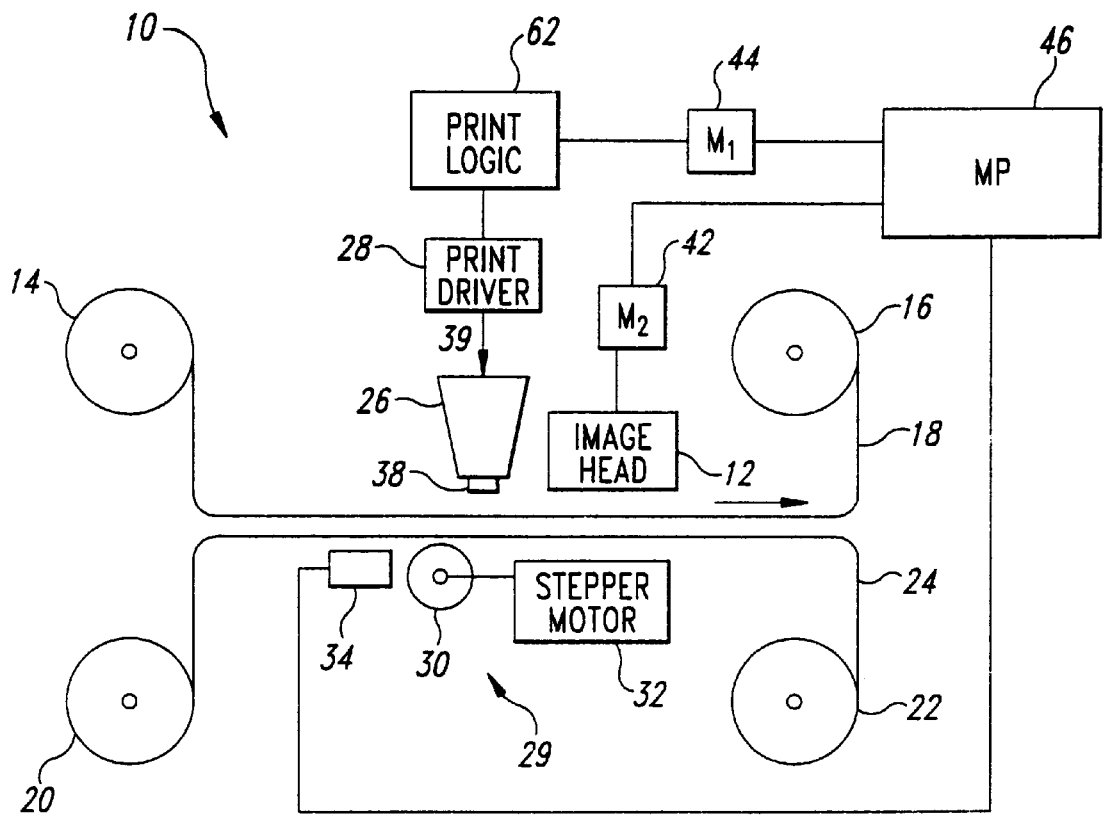
FIG. 1 is a side elevational view of an exemplary embodiment of the inventive printer.

As shown in FIG. 1, an embodiment of the present invention is incorporated in a printer system 10 having an image head, sampling or capturing device 12. The disclosed embodiment of the printer 10 includes a ribbon supply reel 14 and a ribbon take-up reel 16. The ribbon supply reel 14 and ribbon take-up reel 16 provide a continuous supply of thermally sensitive ribbon 18. The printer 10 also includes a media or paper supply reel 20 and a media or paper take-up reel 22. The paper supply reel 20 and paper take-up reel 22 supply a continuous feed of paper or other media 24. The ribbon 18 and paper 24 are proximate one another as they pass a printhead 26. The printhead is activated by a print driver 28 for printing on the paper 24. Alternatively, the ribbon supply reel 14, ribbon take-up reel 16, and the ribbon 18 may be eliminated and a thermally sensitive paper 24 substituted. Indeed, any conventional printhead design may be used. For instance, the printhead 26 may take the form of an impact printer, a thermal dot-matrix printer, or a laser or xerographic printer. In a conventional thermal dot-matrix printer, the printhead 26 contains a series of linearly arrayed and closely spaced resistive elements 38 (FIG. 2).

In the disclosed embodiment, a drive system 29 advances the paper 24 past the printhead 26 and the image head 12.

The drive system 29 includes a platen roller 30 and a stepper motor 32. The stepper motor 32 advances the platen roller 30 in discrete increments. Tracking of the position of the paper 24 may be accomplished with a microprocessor 46 associated with a counter which maintains a count of the steps taken by the stepper motor 32. Alternatively, a tachometer or other conventional device 34 may be used to track the position of the paper either directly, or indirectly.

Figure 2:
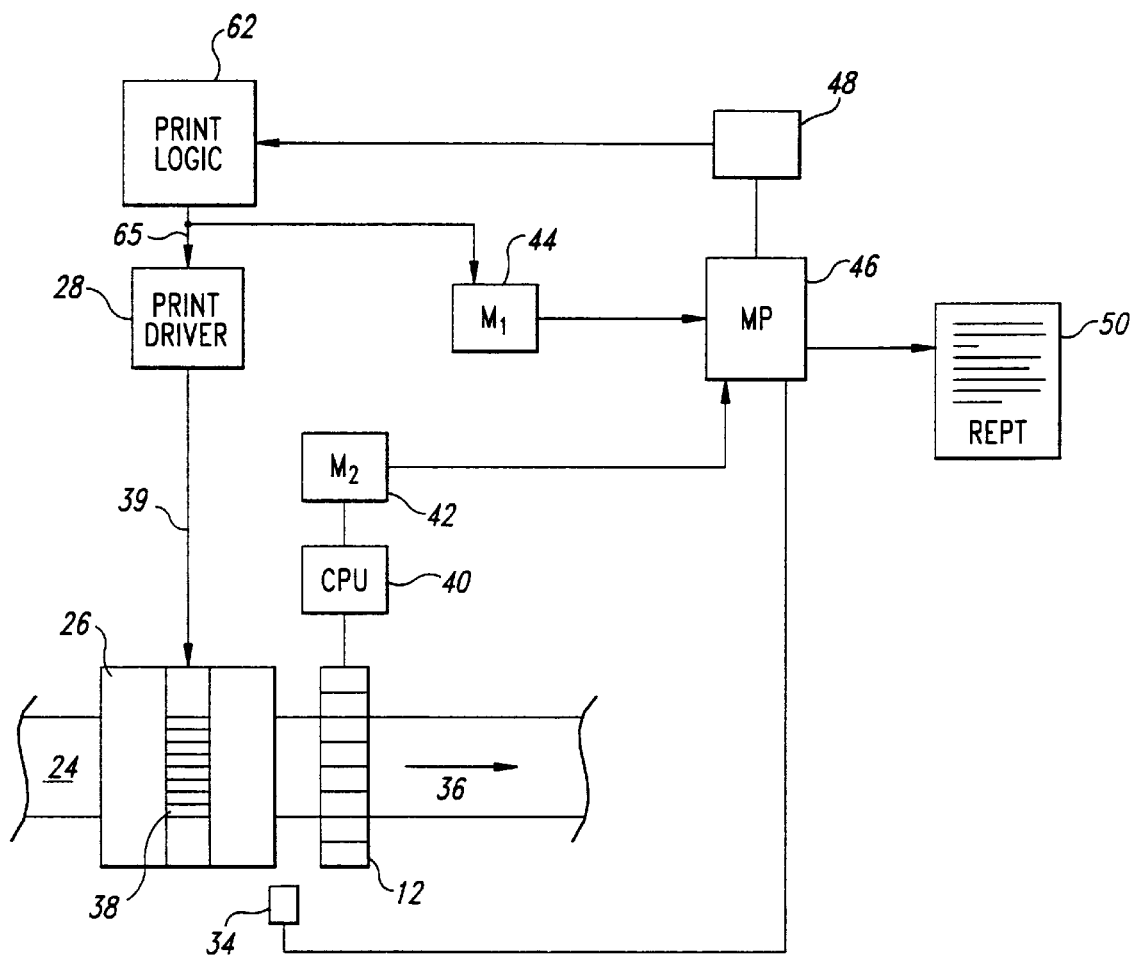
FIG. 2 is a partial top plan view, partial block diagram of the printer of FIG. 1.

FIG. 2 shows a top plan view of the printer 10. The paper or other media 24 is advanced under the printhead 26 and the image head 12 in a printing direction shown by arrow 36. At the roller 30, the paper 24 passes between the roller and a linear array of print elements 38 within the thermal printhead 26. As the paper 24 passes the printhead 26, the paper is held in thermal contact with the printhead by pressure between the printhead and the platen roller 30. Because the roller 30 is an elongated cylinder, it provides a wide area of contact with the paper 24 to minimize side or longitudinal slippage of the paper relative to the roller. The print driver 28 is driven by print commands 65 which comprise retrieved print data 67 in combination with a system clock signal or strobe signal 69 under control of a microprocessor 46 to ensure proper timing and spacing of successive desired portions of the image to be printed by the printhead 26. The operation of the printhead 26 is conventional and well-known and, for the sake of brevity and clarity, it will not be described in further detail.

To print a desired portion of an image, data bits or sequences of data bits retrieved from a location in memory corresponding to the particular pixels in the desired image portion are sent to a buffer and clocked therefrom under control of the microprocessor 46 and print driver 28. The print driver 28 provides an energizing signal to all of the print elements 38 in the printhead 26 through a printhead cable 39. In the thermal printhead 26 of the preferred embodiment, the print driver 28 includes current drivers and complementary logic components in accordance with conventional design, such as those shown in U.S. Pat. No. 5,625,399 issued to Wiklof and assigned to the common assignee of this application, the contents of which are incorporated herein by reference. As each individual print element 38 is heated, the region of the paper 24 aligned to the particular print element is heated. The heat from the print element 38 activates a thermally sensitive ink on the paper 24 and produces the desired portion of the printed image. Alternatively, a thermally sensitive print ribbon 18 may be used, as is conventional for thermal printers. While the printhead 26 is preferably a thermal printhead, other printheads, such as inkjet printheads, may be used. In such embodiments, the media 24 need not include a thermally sensitive coating or ink.

In the exemplary embodiment, the image head 12 takes the form of a linear array of photosensitive elements, preferably a charged coupled device ("CCD") having, for example, linear active surface pixel elements. Other known imagers may be used, such as vidicons, two-dimensional semiconductor arrays, or a two-dimensional CCD array. Additionally, other size CCD arrays may be used, for example, circular or square CCD arrays. The pixel element array defines a field of view of the image head 12. Appropriate conventional focusing optics, electronics and/or a light source (not shown) are also provided as part of the image head 12.

As is known, each pixel element in the linear CCD array of the image head 12 outputs a gray level signal, i.e., an analog signal that determines the amount of intensity of light impinging upon the particular pixel element. Alternatively, each pixel element in the linear CCD array of the image head 12 can output the signal that indicates the gray intensity value of the particular pixel element. In an exemplary embodiment, each pixel element has an intensity value ranging between 0 and 15, or 0 and 255, ranging between black and white. The signals output from the linear CCD array are similar to video data. While the exemplary embodiment of the image head 12 is of a linear imager, those skilled in the relevant art will readily recognize that other image digitizing or capture devices can be employed, including color sensitive equipment.

A central processing unit ("CPU") 40 receives the video data signals output from the image head 12. The CPU 40 preferably includes an analog-to-digital converter that converts the gray level analog signals from the linear CCD array into digital signals. The CPU 40 also preferably includes a clock operating at a high speed so that the CPU similarly operates at a rapid rate.

A first memory area 42, coupled to the CPU 40, stores the digital signals output from the CPU 40. The memory 42 preferably includes both volatile and nonvolatile memory (e.g., random access and electronically erasable read-only memory). An object or image within the field of view of the image head 12 is converted into electrical signals that are digitized and stored in the memory 42 to be retrieved and processed by the CPU 40 under the routine described below.

Figure 3A:
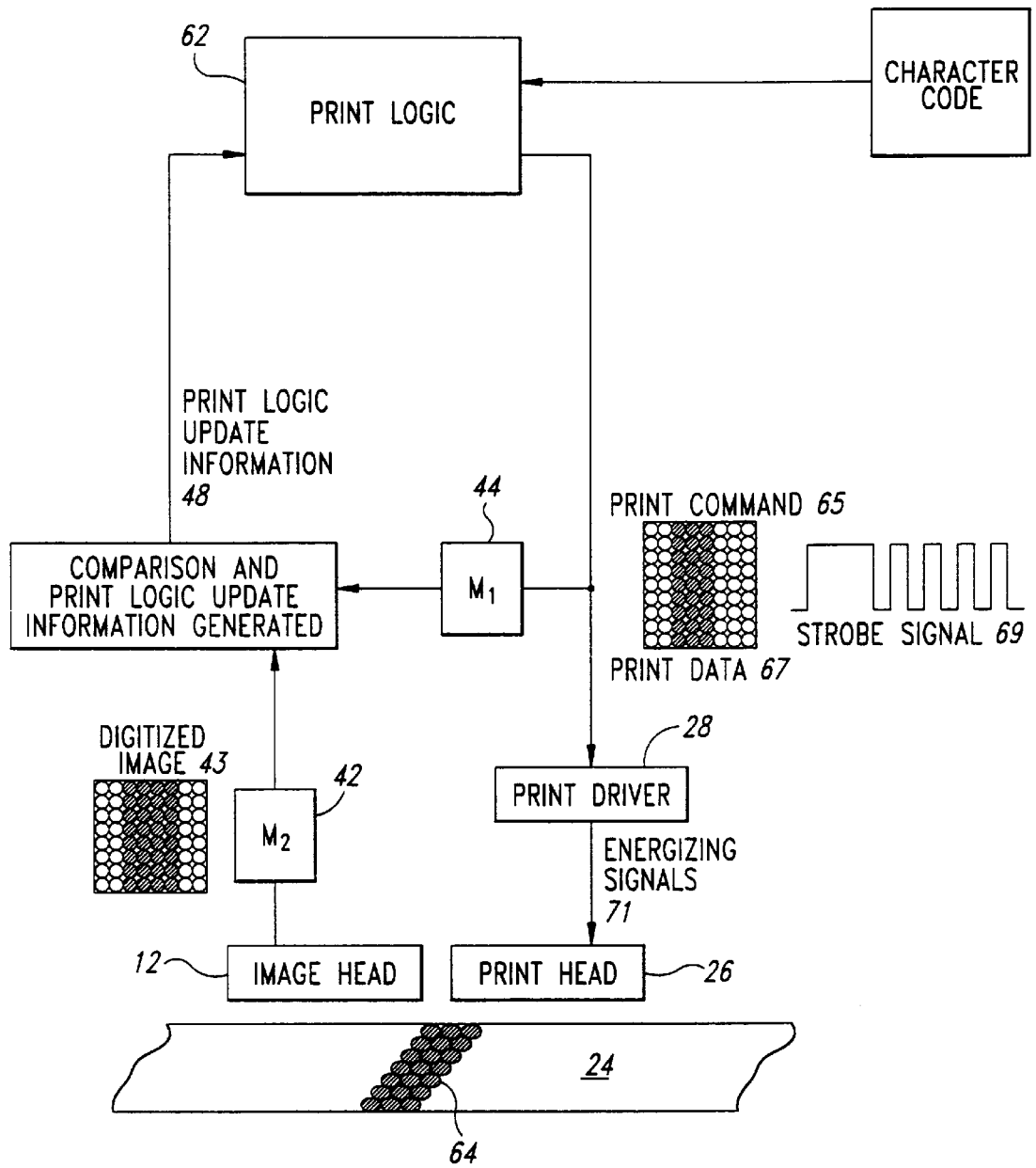
FIG. 3a is a schematic diagram of the signal flow in the exemplary embodiments of the invention of FIG. 1.

With reference to FIG. 3a, the image head 12 captures and stores in the memory 42 a digitized image 43 of a portion of a symbol or symbol element printed by printhead 26. To provide adequate resolution of the symbol in the digitized image 43, the image head 12 preferably includes two pixels for each printed dot. For example, if the print head 26 provides 406 dots per inch and is two inches wide, then the image head 12 should have 1624 pixel elements ((2 inches× 406 dots per inch=812)×2)=1624 pixels. The symbol may take any form of printed data, such as alpha-numeric characters, other characters, graphics, or any other mark printed on media. In the examples discussed herein, the symbol takes the form of a data collection symbol, which can be surrounded by visual information such as alpha-numeric characters. As used herein, a "data collection symbol" includes a symbol from any of the linear, stacked, matrix, and other machine-readable symbologies. "Linear" symbologies generally encode data characters as parallel arrangements of multiple-width rectangular bars and spaces. Each group of unique pattern of bars and spaces within a predetermined width defines a particular data character. "Stacked" symbologies generally employ several adjacent rows, each row having several characters defined by groups of multiple-width bars and spaces. A "matrix" symbology employs an area of data cells rather than one or more rows of bars and spaces. The height and width of each data cell within the matrix are generally equal and the height and width of the symbol is generally comparable.

Figure 3B:
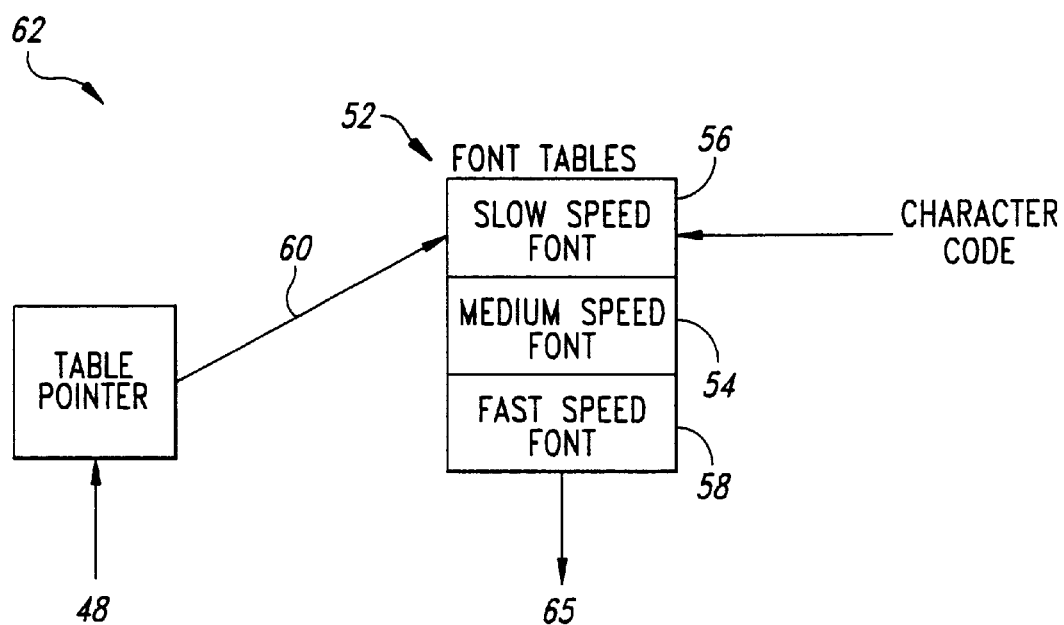
FIG. 3b is a schematic diagram of the print logic according to a first exemplary embodiment of the invention.

The first exemplary embodiment will now be described with reference to FIGS. 3a and 3b. The print logic 62 supplies a print command 65 to a second memory area 44. The print command 65 may be composed of print data 67 and a strobe signal 69. The second memory area 44 may take the form of a two-dimensional array addressed in a Cartesian coordinate system. The print command 65 stored in the second memory area 44 is compared with the portion of the printed image stored in the first memory area 42. In the example shown in FIG. 3a, the pixels of the printed image 64 have been elongated because the speed of the print media is too fast for the slow speed font 56. The elongation of printed image 64 shows up as an extra row of pixels in the digitized image 43. The comparison of the print command 65 and the digitized image 43 may be done by a comparator which may be in the form of a hardwired circuit, a microprocessor, a programmed microprocessor 46 (shown in FIG. 2) or the like. The microprocessor 46 identifies the differences between the print command 65, particularly the print data 67 portion thereof which is stored in the memory 44 and the portion of the digitized image 43 stored in the memory 42. The differences are used by the microprocessor 46 to generate print logic update information 48. The print logic update information 48 is supplied to the print logic 62 for updating the print logic 62. Alternatively, the memory areas 42, 44 may be eliminated, and the digitized image 43 and the print command 65 may be buffered directly into the microprocessor 46.

While font physiology could be calculated in real time from a basic font definition, slower computers typically employed in low-cost printers would make such an approach impractical in most cases. Thus, the print logic 62 is implemented as a table look-up approach, as depicted in FIG. 3. The fonts 54–58 are predefined in a computer memory print table 52. The fonts may be in the form of bit-mapped images or may take the form of the outline fonts. Quite often, only one row of dots or even a portion of each dot in one row of dots need to be removed, or shaved from the end of a bar code bar element to solve printing elongation or dot smearing. In such case, the table 52 would contain one set of font definitions 54 for "normal" fonts, one set of definitions 56 for low-speed fonts, and one definition 58 for high-speed fonts. For other situations, additional font definitions as necessary could be provided. In the example shown, the font definitions 54, 56, 58 might comprise no modification for low-speed operation, removal of a portion of each dot in the last column of dots for normal-speed operation, and removal of an entire last column of dots for high-speed operation. The fonts are accessed through a pointer 60 associated with the print logic 62 which is changed as a function of the print logic update information 48. In that manner, the accessing of different fonts under different criteria provides no computational time penalty. Such operation is taught in applicant's copending applications, entitled SPEED FONTS FOR MATRIX PRINTERS (Ser. No. 08/518,424); DOT PRINTERS WITH WIDTH COMPRESSION CAPABILITIES (Ser. No. 08/518,266); and BAR SHAVING OF THE RESIDENT FONTS IN AN ON-DEMAND BARCODE PRINTER (Ser. No. 08/518,503), all of which were filed on Aug. 23, 1995 and assigned to the common assignee of this application.

Operation of the first exemplary embodiment of the printer with real-time error correction 10 will now be discussed with continuing reference to FIGS. 4–6, in terms of a first example of bar code symbol printing in drag mode and a second example of bar code printing in picket fence mode. The printer and method of printing with real-time error correction should not be considered limited to the discussed examples employing bar code symbols, since the apparatus and method would work for other symbols, such as alpha-numeric characters, graphic elements, marks and the like.

Figure 5:
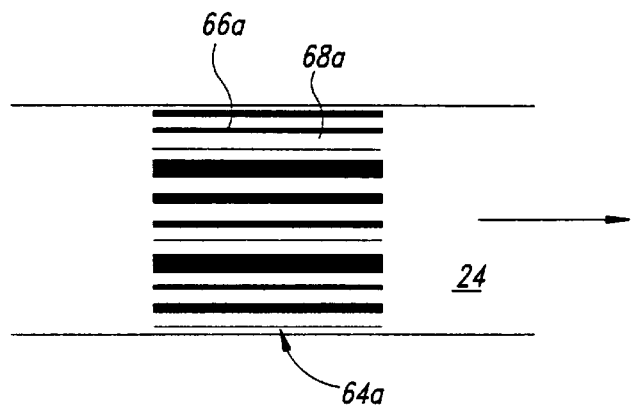
FIG. 5 is a top plan view of a machine readable bar code symbol printed in drag mode.

With specific reference to FIG. 5, a bar code symbol 64a is shown printed in drag mode. The paper 24 moves in a direction of printing 36 past a printhead (not shown). The bar code symbol 64a is shown having bar elements 66a and space elements 68a, running parallel to the direction of printing 36.

Figure 4:
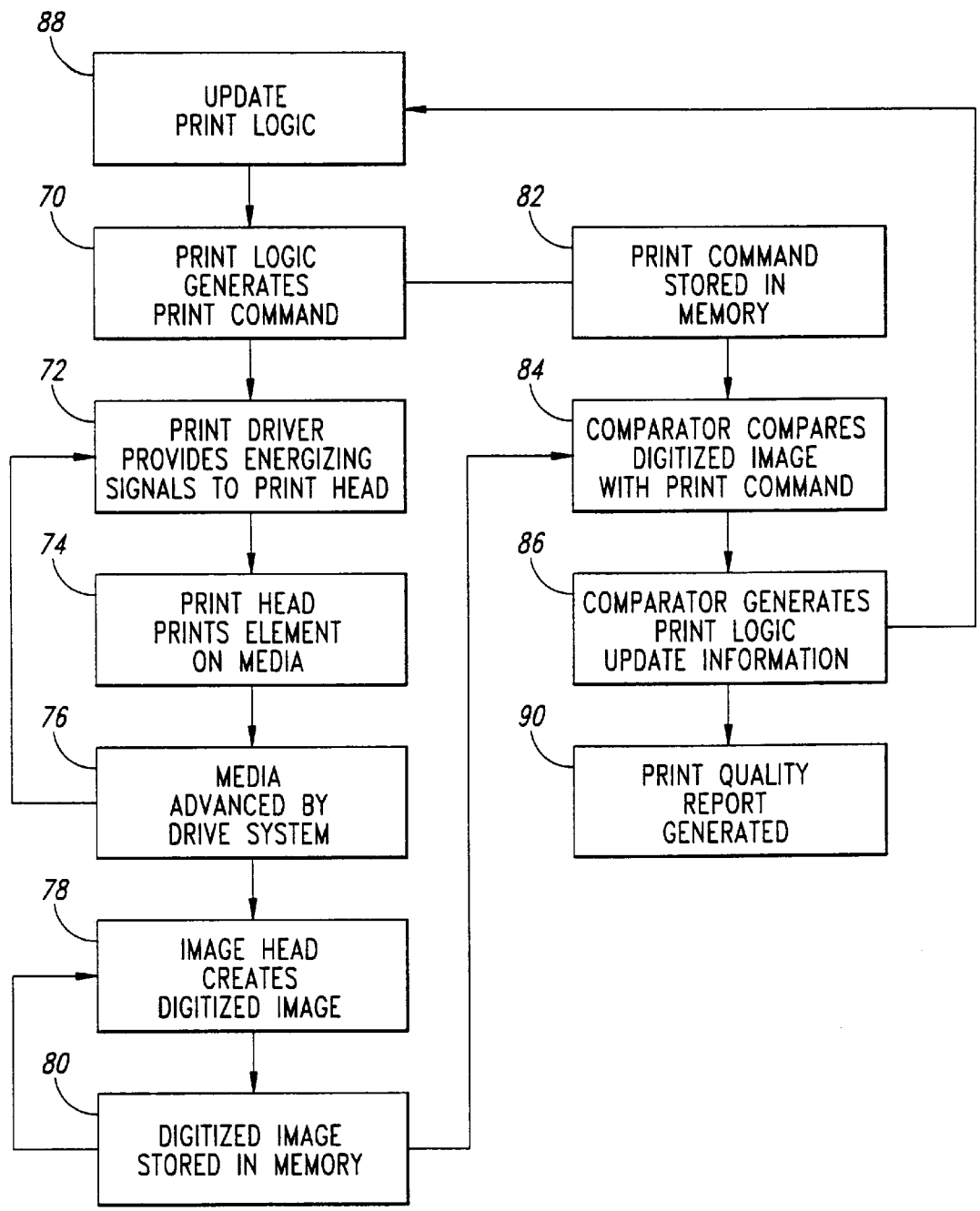
FIG. 4 is a flow diagram of the control flow of the exemplary embodiment of the present invention.

With reference to the flow diagram of FIG. 4, in step 70, print logic 62 generates the print command 65. In step 72, the print driver 28 uses the print command 65 to provide energizing signals 71 to the print elements 38 of printhead 26. In step 74, the activated print elements 38 of printhead 26 print elements 66a, 66b of the symbol 64a, 64b on the media 24 (FIGS. 5 and 6). In step 76, the media is advanced by the drive system 29. Each time that the media 24 is advanced by the drive system 29, the print driver 28 activates print elements 38 of printhead 26 for further printing on the media 24. In step 78, as the printed elements advance past the printhead 26, the image head 12 images the printed element. In step 80, the digitized image 43 of the printed element is stored in the first memory array area 42. In the case of a linear image head, successive images of the printed element may be buffered into first memory area 42. In step 82, the print command 65 is stored in second memory area 44. In step 84, the programmed microprocessor 46, compares the digitized image 43 stored in the first memory area 40 with the print command 65 stored in the second memory area 44. In the exemplary embodiment, the microprocessor 46 does a bit by bit comparison of the digitized image 43 and the print command 65. While the digitized image 43 is compared to the print command 65 in the first exemplary embodiment, the digitized image 43 could equally have been compared against any other defined standard. In step 86, the microprocessor 46 uses the results of the comparison to generate the print logic update information 48. In the first exemplary embodiment, the bit by bit comparison determines whether the printed dots are different from the desired image. For example, it may be determined whether the dots are smearing and if they are smearing, to what extent they are smearing. The print logic update information 48 may, for example, take the form of an updated pointer 60 to the font table 52. In step 88, the print logic update information 48 is used to generate a new print command 65. As described above, in the first exemplary embodiment, the print data 67 portion of the print command is adjusted. In step 90, a print quality report 50 can be generated. The print quality report 50 may be based on the differences found by the microprocessor 46, or based on the print logic update information 48 or by comparison to any other defined standard. The print quality report 50, may for example, provide an indication of whether or not the printed image in within "spec" with respect to some defined specification, such as by providing a grade for each printed image. The print quality report 50, may indicate the manner in which the printed image differs from the desired image, and the steps taken by the printer to correct the deviation. For instance, a new supply of paper having physical characteristics, such as thickness, density, moisture content, surface roughness, porosity, compressibility, overcoat and dielectric properties, which differ from the previous paper supply may initially cause a deviation from the desired output. The print quality report 50 may indicate that the deviation occurred, may provided the reason for the deviation based on a predefined set of symptoms and causes, and may provide an indication of the corrective action taken by the printer. The print quality report 50 may also indicate when the deviation is so severe that the printer cannot adequately compensate, and may further provide guidance for addressing the problem, such as servicing the printer or substituting a higher quality of media, toner or ink. The print quality report 50 may, for example, be provided on an element by element basis or a symbol by symbol basis.

The number of elements printed, and steps advanced by the drive system 29 relative to the number of times the print logic is updated may be varied to suit any particular circumstance.

With specific reference to FIG. 5, the bar elements 66a of the machine readable bar code symbol 64a are composed of closely adjacent dots (not shown). As the media 24 advances past the printhead 26, the image head 12 digitizes the elements of the bar code symbol 66a. Successive portions of the elements may be imaged and stored in memory area 42 for comparison with the print command 65, stored in memory area 44. In the case of drag mode printing, as shown in FIG. 5, the portion of the printed image that is digitized includes a portion of a plurality of bar code characters 66a, 68a. Since only a portion of the bar code characters 66a, 68a is being sampled and compared with the print command 65, the print logic 62 and hence the print command 65 and the print driver 28 may be update before the entire bar code symbol 64a is finished being printing.

Figure 6:
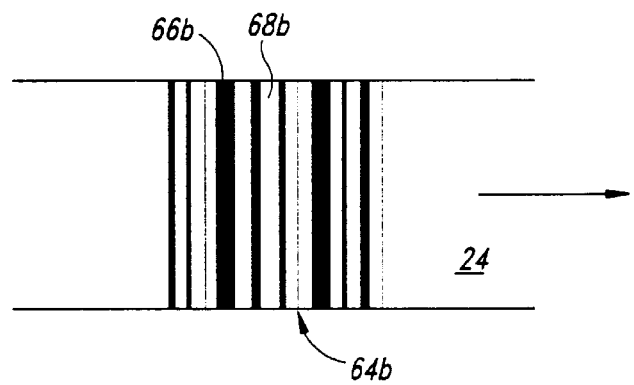
FIG. 6 is a top plan view of a machine readable bar code symbol printed in picket fence mode.

With specific reference to FIG. 6, a machine readable bar code symbol 64b printed in picket fence mode is shown. The bar code symbol 64b includes bar elements 66b and space elements 68b. The bar code bar elements 66b and the bar code space elements 68b are printed perpendicularly to the direction of printing 36. As the picket fence bar code symbol 64b advances past printhead 26, it is sampled or digitized by image head 12. The portion of the bar code symbol 64b or bar code element 66b, 68b digitized, is stored in memory area 42. The digitized image 43 may be compared to the print command 65 stored in memory area 44. With respect to bar code symbols printed in picket fence mode 64b, the digitized image 43 will be a portion of one bar code element 66b, 68b. Successive imaged portions may be accumulated in memory area 42. The imaged portions stored in memory area 42 may be compared with the print command 65 stored in the memory area 44. Thus, print logic update information 48 may be generated and used to update the print logic 62, the print command 65 and the print driver 28 before the entire bar code symbol 64b is finished being printed. Error correction thus happens in real time.

Figure 7:
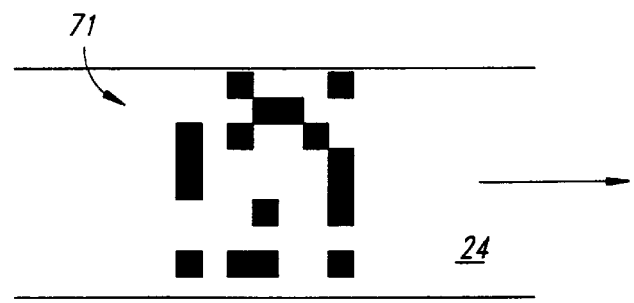
FIG. 7 is a top plan view of a machine readable 2 dimensional matrix symbol.

With specific reference to FIG. 7, a two dimensional matrix or area symbol 71 is shown. Information is encoded in the arrangement and areas of the elements comprising the symbol 71. The exemplary embodiments will work with matrix symbols in the same manner as they work with linear symbols, and with any other symbols, including but not limited to alpha-numeric and graphic symbols.

The second exemplary embodiment will now be discussed with reference to FIGS. 3a and 3c. While similar in many respects to the first exemplary embodiment, the second exemplary embodiment employs a modified print logic 62' and comparison in order to anticipate and adjust for thermally induced printing problems. It is well known that the previous thermal status of a resistive element in a printhead can cause deviations in the printed image from that desired. It is also well known that the heat from neighboring resistive elements can have a negative effect on the printed image. The exemplary method uses the digitized image 43 and the print command 65 to determine the thermal status and history of the resistive elements 38 (FIGS. 1 and 2) and to make corrective adjustments based on that information.

The print logic 62' generates print command 65 encoding the desired image. The print command 65 is compared on a pixel by pixel basis with the digitized image 43 to determine the thermal history of the resistive element associated the pixel, as well as, the thermal status and history of neighboring resistive elements. The print logic 62' employs a look-up table 100 (FIG. 3c) for adjusting the power provided to the resistive elements in conjunction with the print logic update information 48 generated by comparison step 84 (FIG. 4). An algorithm may be employed as an alternative to the look-up table 100.

Figure 3C:
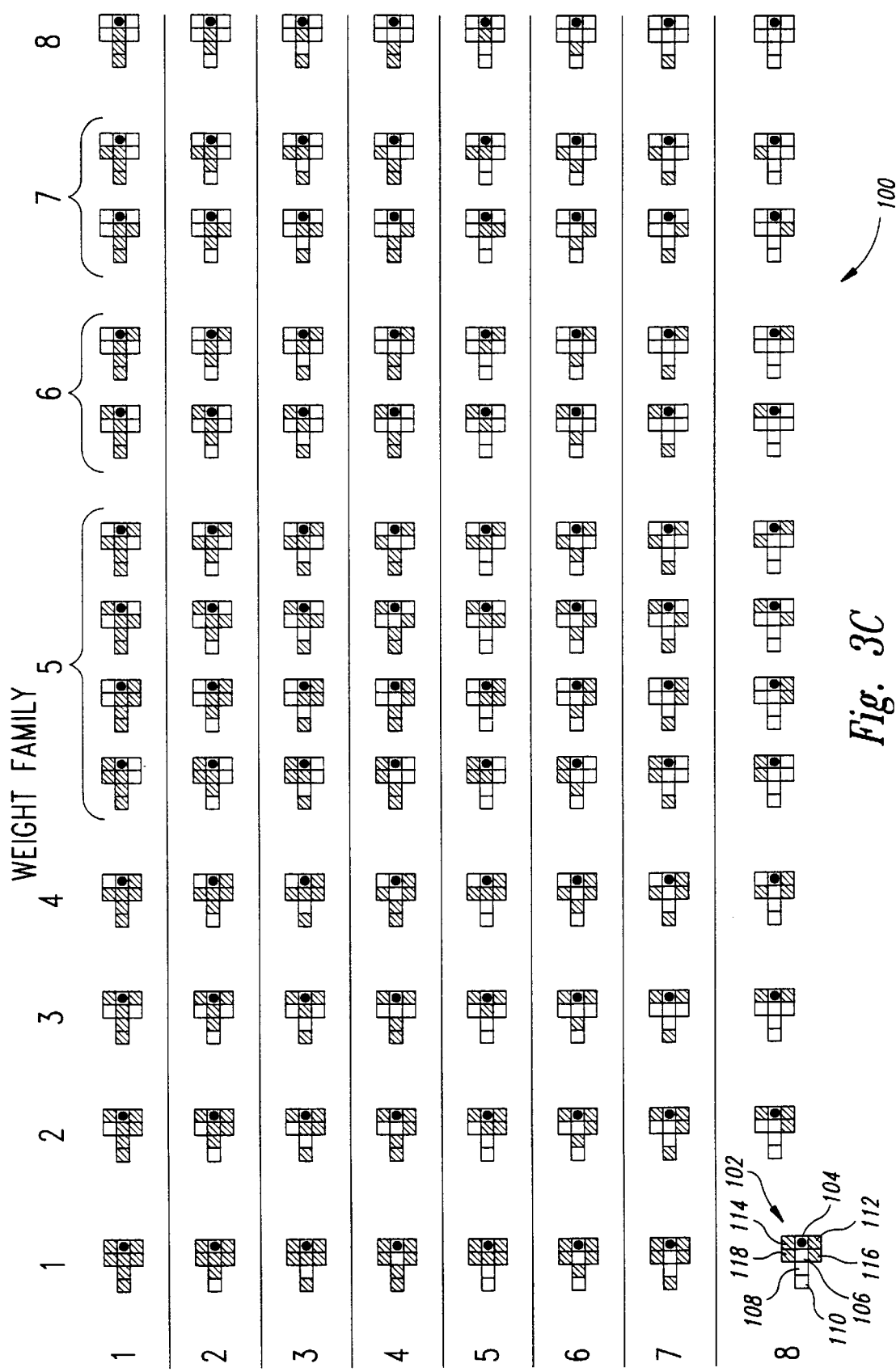
FIG. 3c is a schematic diagram of the print logic according to a secondary exemplary embodiment of the invention.

With particular reference to FIG. 3c, the present and past status of a given resistive element and the immediately adjacent resistive elements is indicated by an array of squares 102 containing symbols that indicate whether the resistive elements have been or will be heated. The central square 104 contains a circular dot, indicating that this square represents the current state of the selected resistive element. Extending from this square are additional squares 106, 108, 110 successively indicating the past history of the selected resistive element. Relatively above and below the central square are squares representing the current status 112, 114, and one generation of past history 116, 118 of the adjacent resistive elements. The number of adjacent resistive elements examined and the number of successive past generations examined may be adjusted to suit the equipment or needs of the user. In this example, the method is only concerned with the current status of the selected resistive element and the selected resistive element's three most recent preceding statuses, as well as, the current status and most recent preceding statuses of each of the immediately adjacent resistive elements. Each of the statuses can have only one of two states, "ON" or "OFF". These patterns may be grouped and assigned a distinct level of energization for the selected print element. Such a method is described in U.S. Pat. No. 5,625,399, previously incorporated herein by reference. The energization level may be provided to the print driver as part of the print command 65 in the form of the strobe signal 69, which may be combined with the print data 67 portion of the print command 65 by a logical AND to provide an energizing signal 71 to the resistive elements of the printhead.

Although specific embodiments of the printer and method of printing, and examples of the present invention have been described above for illustrative purposes, various equivalent modifications may be made without departing from the spirit and scope of the invention, as will be recognized by those skilled in the relevant art. The teachings provided herein of the present invention can be applied to other printers and methods of printing, not necessarily the exemplary printer and method for printing bar code symbols generally described above. For example, the printer may be used to print alpha-numeric characters, graphic images or any other type of symbol or mark. Alternatively, the apparatus and method may be used to perform color correction where a color print head and color sensitive image head are incorporated in the printer. Additionally, the present invention can incorporate the teachings of the U.S. Patents and/or applications described herein to provide additional benefits and functionality. The U.S. Patent and applications cited above are incorporated herein by reference as if set forth in their entirety.

These and other changes can be made to the invention in light of the above detailed description. In general, in the following claims, the terms should not be construed to limit the invention to the specific embodiments disclosed in the specification and claims, but should be construed to include all apparatus and methods for printing with real time print quality correction. Accordingly, the invention is not limited by the disclosure, but instead its scope is to be determined entirely by the following claims.

I claim:

1. A method of printing a bar code symbol on a media, the method comprising:

driving a print head in response to print data defining a printable image provided by a print logic to print an element of the bar code symbol on the media;

operating an image head to create a digitized image of the printed element;

comparing the digitized image of the printed element with the print data;

generating a print logic update information based on the comparison; and updating the print logic with the print logic update information before all elements of the bar code symbol are printed.

2. The method of claim 1 wherein driving a print head includes printing a bar element of the bar code symbol.

3. The method of claim 2 wherein driving a print head includes printing a portion of a bar element of the bar code symbol.

4. A method of printing marks on a media, the method comprising:

driving a print head in response to print data defining a printable image provided by a print logic to print a first set of marks on the media;

operating an image head to create a digitized image of the first set of marks;

comparing the digitized image with the print data;

generating print logic update information based on the comparison; and updating the print logic with the print logic update information before printing a second set of marks.

5. The method of claim 4 wherein driving a print head to print a first set of marks comprises:

supplying a print data to a print driver; and supplying a strobe signal to a print driver.

6. The method of claim 4 wherein driving a print head to print a first set of marks includes printing a bar element of a bar code symbol.

7. The method of claim 4 wherein driving a print head to print a first set of marks includes printing a portion of a bar element of a bar code symbol.

8. The method of claim 4 wherein driving a print head to print a first set of marks includes printing a portion of a plurality of bar elements of a bar code symbol.

9. The method of claim 4 wherein driving a print bead to print a first set of marks includes printing a portion of an alpha-numeric character symbol.

10. The method of claim 4 wherein driving a print head to print a first set of marks includes printing a portion of a graphic symbol.

11. The method of claim 4 further comprising:

generating a print quality report based on a result of the comparison.

12. A method of printing a symbol on a media, the method of printing comprising:

printing an element of the symbol on the media in response to print data provided by a print logic;

creating an image of the printed element;

comparing the created image with the print data; and adjusting the printing based on the comparison before all of the elements of the symbol are printed.

13. The method of claim 12 wherein printing an element of the symbol comprises:

supplying the print data to a print driver; and supplying a strobe signal to the print driver, the strobe signal modulated to control an amount of power delivered to a resistive element of a thermal print head.

14. The method of claim 12, further comprising:

storing the imaged portion of the element printed on the media in a memory device.

15. The method of claim 12 wherein printing an element of the symbol includes printing a bar element of a bar code symbol.

16. The method of claim 12 wherein printing an element of the symbol includes printing a portion of a bar element of a bar code symbol.

17. The method of claim 12 wherein printing an element of the symbol includes printing a portion of a plurality of bar elements of a bar code symbol.

18. The method of claim 12 wherein printing an element includes printing a portion of an alpha-numeric character symbol.

19. The method of claim 12 wherein printing an element includes printing a portion of a graphic symbol.

20. The method of claim 12, further comprising:

generating a print quality report from the print logic update information.

21. A media having a symbol printed thereon by the method comprising:

driving a print head with print data corresponding to a printable image and provided by a print logic to print an element of a symbol on the media;

imaging at least a portion of the element of the symbol printed on the media to create an imaged portion of the element printed on the media;

comparing the imaged portion of the element printed on the media with the print data to generate print logic update information;

updating the print logic with the print logic update information before all of the elements of the symbol are printed on the media.

* * * * *